(12) United States Patent
Newman

(10) Patent No.: US 9,202,463 B2
(45) Date of Patent: Dec. 1, 2015

(54) VOICE-ACTIVATED PRECISION TIMING

(71) Applicant: David Edward Newman, Temecula, CA (US)

(72) Inventor: David Edward Newman, Temecula, CA (US)

(73) Assignee: ZANAVOX, Temecula, CA (US)

(*) Notice: Subject to any disclaimer, the term of this patent is extended or adjusted under 35 U.S.C. 154(b) by 402 days.

(21) Appl. No.: 13/854,933

(22) Filed: Apr. 1, 2013

(65) Prior Publication Data

US 2014/0297287 A1  Oct. 2, 2014

(51) Int. Cl.
| | |
|---|---|
| *G10L 15/08* | (2006.01) |
| *G10L 15/22* | (2006.01) |
| *G10L 25/78* | (2013.01) |
| *G10L 25/93* | (2013.01) |

(52) U.S. Cl.
CPC ............ *G10L 15/08* (2013.01); *G10L 15/22* (2013.01); *G10L 25/78* (2013.01); *G10L 25/93* (2013.01); *G10L 2015/223* (2013.01); *G10L 2025/786* (2013.01)

(58) Field of Classification Search
CPC ............ G10L 25/78; G10L 2025/783; G10L 2025/786; G10L 15/22; G10L 2015/221; G10L 15/222; G10L 2015/223; G10L 2015/225; G10L 2015/226; G10L 2015/227; G10L 2015/228
See application file for complete search history.

(56) References Cited

U.S. PATENT DOCUMENTS

| | | | |
|---|---|---|---|
| 6,092,043 A * | 7/2000 | Squires et al. | 704/251 |
| 7,027,991 B2 | 4/2006 | Alexander | |
| 7,523,038 B2 | 4/2009 | Ariav | |
| 2002/0143554 A1 | 10/2002 | Hou | |
| 2003/0158732 A1 * | 8/2003 | Pi et al. | 704/251 |
| 2004/0083107 A1 * | 4/2004 | Noda et al. | 704/270 |
| 2005/0102134 A1 * | 5/2005 | Manabe et al. | 704/207 |
| 2005/0248931 A1 | 11/2005 | Alvarez | |
| 2007/0198268 A1 * | 8/2007 | Hennecke | 704/270 |
| 2009/0326944 A1 * | 12/2009 | Yano et al. | 704/246 |
| 2011/0246189 A1 * | 10/2011 | Fox et al. | 704/210 |
| 2012/0323577 A1 * | 12/2012 | Correia et al. | 704/254 |
| 2013/0339028 A1 * | 12/2013 | Rosner et al. | 704/275 |
| 2014/0201639 A1 * | 7/2014 | Savolainen et al. | 715/727 |

FOREIGN PATENT DOCUMENTS

EP     0994536     4/2000

* cited by examiner

*Primary Examiner* — Eric Yen

(57) ABSTRACT

A method is disclosed for generating a voice-activated responsive action, such as a pulse or a measurement, with improved speed and time resolution. First, an operator calls an arming command to prepare the application, and then calls a trigger command to initiate the responsive action. The responsive action is generated immediately upon detecting the leading edge of the trigger command, resulting in an extremely fast response with precise timing. The particular responsive action may be determined by the type of sound detected, or by other information contained in the trigger command, or by the arming command, or by another prior command. Other types of preparatory events are disclosed. Efficient methods for identifying commands are disclosed. For all applications requiring an extremely prompt, precisely timed, hands-free response to a voice command, this invention is enabling.

18 Claims, 8 Drawing Sheets

VOICE-ACTIVATED PRECISION TIMING

BACKGROUND OF THE INVENTION

The invention relates to voice-activation technology, and particularly to means for controlling the timing of a responsive action by voice commands.

Most emerging voice-activated applications rely on advanced speech-analysis software for freeform speech interpretation. These applications offer the advantage of convenience, allowing the user to obtain a response without using a keyboard or buttons, but always with an unpredictable delay. Many applications in science and technology, however, involve a transient event that demands a fast and well-timed voice-command response. Such applications are served poorly by the prior art in voice activation, due to the delays and unpredictability of freeform language interpretation, and other delays inherent in prior art technology. The elaborate software that processes freeform speech usually includes probabilistic models, and usually involves multiple computers communicating through wireless links, and usually attempts to interpret an infinite variety of possible commands. The result is an expensive setup, an unpredictable outcome, and a reaction that arrives well after the transient event has passed. By contrast, most serious timing applications in science and technology involve at most a few specific operations, but they must be extremely well-timed. For such applications, freeform speech interpretation is neither required nor helpful.

Prior art also includes a variety of simple sound-activated devices including clap-triggered light switches that respond to an impulse sound, and low-cost kits that convert almost any sound to a switch signal. While some of these sound-activated devices provide a fairly quick responsive action, none of them is suitable for electronics testing applications due to lack of command selectivity, lack of means for interpreting commands, and lack of means for determining when a command starts and ends, and lack of user control over the triggering process.

Applications requiring a fast but command-specific response are abundant in research and industry. Electronics workers, particularly test and measurement workers, often need to trigger an oscilloscope or other analyzer at a particular moment to capture a transient signal. Laboratory workers often need to record or measure something at a precise time. Machinists often need to stop a cut at a particular time. Assemblers and other industrial workers often need to coordinate one action with another action requiring carefully controlled timing. In each of these situations, an operator needs a responsive action instantly at a moment of the operator's own choosing, and a delayed or unpredictable response is worse than useless.

What is needed is a method to produce a very prompt voice-controlled responsive action with minimal time uncertainty, but only when specifically commanded by the operator. Preferably the new method would include means for determining when a spoken command begins and ends, for identifying the commands without sacrificing time resolution, and for minimizing false triggering on noise. Such a method would enable precise responsive timing, hands-free and under the user's control, in applications ranging from electronics to research to manufacturing technologies.

BRIEF SUMMARY OF THE INVENTION

The invention is a method for producing a voice-activated responsive action with superior promptness, control, and time resolution. The inventive method includes detecting a preparatory event, then detecting a silent interval, then detecting the sound of a spoken command termed the trigger command, and then immediately initiating the responsive action. The inventive responsive action is initiated as soon as the first sound of the trigger command is detected, in contrast to prior art methods wherein a responsive action occurs long after the command has been fully spoken. The main objective of the invention is to provide the immediate responsive action at the start of the operator's trigger command, and at no other time, thereby minimizing the delay and optimizing the time resolution of the responsive action. A second objective is to provide a high degree of reliability and noise immunity, by initiating the responsive action only after detecting the preparatory event and the silent interval and a suitable trigger command. A third objective is to provide a multitude of options for the operator to control the immediate responsive action, using manual controls and voice commands and other signals for example. The key inventive concept is that the responsive action is initiated, after a preparatory event, upon the first sound of the trigger command.

When initiated according to the inventive method, the responsive action has sharp and predictable timing, controlled entirely by the operator. The invention eliminates the delays and uncertainty that limit prior art methods due to speech interpretation software and wireless communication delays, among other delays; yet the method includes sufficient analysis to discriminate various commands, and to determine exactly when a trigger command has started, so that the responsive action may be initiated at that moment. Unlike prior art methods that initiate a responsive action only after a trigger command has been fully spoken and then interpreted, the inventive method initiates the responsive action immediately when the first sound of the trigger command is detected. And unlike prior art methods wherein a responsive action is triggered upon any sound at any time, the inventive method requires both a preparatory event and a silent interval before the trigger command.

For all voice-activated applications requiring a well-timed reaction to a voice command, this invention is enabling. The invention makes precision-timed voice-activated applications feasible for the first time, including a voice-activated oscilloscope trigger, voice-activated pulse generator, voice-activated voltmeter, and a voice-activated stopwatch, to name just a few.

The inventive preparatory event is any detectable change or energy, occurring at a any time prior to the trigger command. The preparatory event may be a particular spoken command termed the arming command, or a mechanical change such as a button press or a cam-switch closure, or an input voltage including positive and negative voltages as well as ground, or a digital message in any code or protocol, or an electronic signal such as a pulse or frequency, or an optical signal such as visible or infrared light, or an acoustical signal such as a clap or a clicker or a tone or an ultrasonic pulse, or any other detectable signal. There may be several different types of preparatory events, each prompting different actions. One particular responsive action is then carried out according to a measured property of the preparatory event, or of the trigger command, or of some other command. Also, various parameters may be adjusted responsive to the preparatory event or the trigger command or the arming command or other commands, and the parameters may be adjusted manually with a knob or switch, and they may be adjusted automatically under software control based on a received signal or a background noise level for example. An indicator such as an LED (light-emitting diode) or LCD (liquid crystal display) may indicate when the preparatory event has been received, or is being received, or has not yet been received.

The required silent interval, following the preparatory event and before the trigger command, is necessary to identify the start of the trigger command. Generally the operator wants the responsive action to occur exactly upon the leading sound of the trigger command, and at no other time. The silent interval guarantees that the preparatory event and any previous sounds have subsided before the trigger command begins. This also provides time for a system to get ready to generate the fast responsive action when so commanded. The required duration of the silent interval may be termed Sinitial, which is preferably longer than the silent intervals that commonly occur within a spoken command, but not so long that the application seems balky. Usually Sinitial is in the range of 50 to 900 milliseconds.

The inventive trigger command and arming command and other spoken commands comprise any utterance including any word or words, phrases, nonsense sounds, or anything else that the operator may say, so long as the command includes sufficient sound to exceed a predetermined threshold.

The inventive responsive action is any electronic or mechanical change that can be produced consequent to the detection of sound, such as emitting a pulse, sending a message, performing a measurement, executing a computer instruction, altering a computer register, altering a display, or starting a process. The responsive action is initiated (or triggered or started or executed or otherwise caused to occur) immediately after the sound has been detected exceeding the predetermined threshold. The sound exceeds the predetermined threshold when an analog or digital signal related to the sound becomes more positive than a predetermined positive threshold value, or when that signal becomes more negative than a predetermined negative threshold value. Alternatively, the sound exceeds the predetermined threshold when a digitized or processed or filtered or smoothed digital signal, derived from the sound or a portion of the sound, exceeds a predetermined digital value. The analog and digital signals related to the command sound, and analog and digital signals derived from them, and functions thereof, may be referred to as "sound signals".

Initiating the responsive action "immediately" usually means initiating the action as soon as a sound exceeding the predetermined threshold is detected. Depending on the application, an immediate response may comprise a response without discernible delay, or occurring within a specified time limit, relative to the start of the trigger command sound. In systems controlled by a digital processor, immediate responsiveness may comprise initiating the responsive action on the next processor clock cycle after detecting that the sound exceeds the predetermined threshold. However, the response is not immediate if there is any discernible delay between the start of the trigger command sound and the start of the responsive action. Prior methods typically include substantial annoying delays, including waiting for a speech interpretation process to be performed, and then waiting for a wireless link to convey a processing result, and other delays. Such late responses would certainly not qualify as immediate. In the context of a transient-event measurements, all such delays would be unacceptable.

The inventive method may employ an arming parameter, which can be set to an armed state or a non-armed state. When the preparatory event is detected, the arming parameter is set to the armed state. When the first sound of a trigger command is detected, the immediate responsive action is initiated, but only if the arming parameter is armed at that time. Normally the arming parameter is returned to the non-armed state after each responsive action is initiated; hence the operator must call the arming command again to obtain the responsive action a second time. As an alternative, the arming parameter may be kept in the armed state after the responsive action, in which case the operator can obtain a series of responsive actions by repeatedly calling the trigger command without having to call the arming command each time. Preferably the arming parameter would be set non-armed when a certain time has elapsed, or a particular disarming command is received, or a certain signal is received, or the operator presses a button, or other disarming event. If the operator calls the trigger command while the arming parameter is non-armed, the result will depend on how the application is programmed. Upon a trigger call when non-armed, the application could generate the usual responsive action, but only after the trigger command has been fully parsed and analyzed. Such a late response would not be immediate, since it occurs after the command has finished, but it would be satisfactory for many operations such as setting a parameter. Alternatively, a non-armed trigger command may be ignored, or it may cause some other response such as an error message.

The inventive method includes steps for detecting silent intervals and measuring their duration. Silence is detected when a signal related to the command sound, and other sounds, remains below a predetermined minimum. The duration of a silent interval is usually measured by counting a periodic pulse such as a clock pulse, and resetting the count to zero whenever the sound exceeds the predetermined minimum. Then, when the count finally reaches a number that corresponds to the required duration Sinitial, the silence requirement has been met. Or, the counter may count down from a preset value, reaching zero only if the silent interval is sufficiently long. Preferably the predetermined minimum is well above the amplitude level of continuous electronic and background noise, but below the sound level of commands for example.

The inventive method includes steps for detecting command sounds. First, the sound of the command is converted to an electrical signal using a transducer such as a microphone, and then the electrical signal is analyzed to determine when the sound exceeds the predetermined threshold. Such analyzing usually includes amplifying and optionally filtering the raw analog signal from the microphone, then digitizing the amplified signal with an ADC (analog-to-digital converter) or the like, thereby producing a digitized signal. The ADC output is termed the "digitized signal", comprising a multitude of sequential digital values, each value being related to the sound at the time of the digitization. The inventive analyzing further includes comparing the amplified analog signal to a voltage, in which case the predetermined threshold is the comparison voltage, and the sound is detected when the analog signal exceeds that voltage. Or, the analyzing may include comparing the digitized signal, or a function of the digitized signal, to a certain digital value, in which case the predetermined threshold is that certain digital value.

The inventive analyzing may also include detecting a certain feature of the sound, such as a particular type of sound, and then initiating a particular responsive action accordingly. The inventive analyzing may further include processing sound signals to suppress noise or saturation. The inventive analyzing may also depend on parameters that are variable, and such variable parameters may be controlled or adjusted by means of the arming command or some other command preceding the trigger command, or by a manually-operated control, or by some feature of the trigger command itself.

The inventive method includes a "single-wave detection" mode wherein the responsive action is initiated when the analog amplified sound signal first exceeds a voltage value, or the digitized signal first exceeds a digital value representing the predetermined threshold. With single-wave detection, the command is detected upon the first significant sound wave of the command sound. This results in extremely prompt initiation of the responsive action. If the sound signal exhibits both positive and negative variations relative to a baseline value representing silence, then the sound signal may be compared to two thresholds, corresponding to positive and negative variations, and the responsive action would be initiated when the sound signal first exceeds either of the thresholds.

The inventive method also includes a "sound-type detection" mode, wherein the sound signal is processed to determine if the command begins with a particular type of sound, such as a voiced or unvoiced sound, and then the responsive action is initiated only if a certain sound type is detected. Initiating the responsive action upon a particular sound type has the advantages of reducing noise, enhancing the overall sound detection reliability, and enabling rapid identification of the command. However, the responsive action is slightly delayed due to the time required for sound-type analysis.

Spoken sounds may be classed as voiced or unvoiced. Voiced sound is any sound produced by the vocal cords. Unvoiced sound is generated by a restriction in the air tract but without vocal cord involvement. For example the vowels are all voiced, as are certain consonants such as B, M, V, and R. Other consonants, such as F, K, S, P, and T are unvoiced since they are formed by restricting the air passage with the tongue or lips without resonating the vocal cords. (Each example-letter stands for the sound produced when that letter is used in normal English speech).

Arming commands and other commands can be parsed and identified according to the order of sound types detected in the command sound. For example the command "SET" has an unvoiced interval for the S sound, then a voiced interval for the E, and then an unvoiced T. The command "GO" has a single voiced interval that combines both of the letter sounds into one voiced sound interval. Some commands also contain silent intervals. The spoken command and each predetermined command comprises voiced and unvoiced and silent intervals in a particular order. In a sparse-command application, only certain predetermined commands are recognized, and each of the predetermined commands has a unique order of voiced and unvoiced and silent intervals. The spoken command can thus be analyzed to determine the order of voiced and unvoiced and silent intervals in the spoken command, which is then compared to the order of sound types in each of the predetermined commands. When the spoken command order matches the order of one of the predetermined commands, the spoken command is thereby identified. In some applications, commands are identified in this way with near-perfect reliability. But if the order of sound types in the spoken command fails to match any of the predetermined commands, this indicates that the spoken command is not one of the predetermined commands. The unidentified command may be ignored, or an error message may be generated, or other consequence depending on the application.

The waveforms of voiced and unvoiced sounds are quite different. In the frequency domain, voiced sounds fall generally in a frequency range of about 30 to 1000 Hz or so, while unvoiced sounds extend from about 3000 to 20000 Hz. The sound type can be determined using analog electronics, for example using two electronic filters, such as a highpass filter to select unvoiced sounds with higher frequencies, and a lowpass filter to select voiced sounds with lower frequencies.

Or the frequency analysis can be digital, for example using a transform program such as FFT (fast Fourier transform) to obtain the sound spectrum. Sound energy in higher and lower regions of the spectrum correspond to unvoiced and voiced sounds respectively. However, spoken sound waves are chaotic, non-repeating, and almost never sinusoidal, which makes the frequency analysis problematic. Therefore it is helpful to consider the time domain. For voiced sounds, the time-domain waveform includes relatively slow signal variations that vary with a time scale of 1 to 30 milliseconds generally, while unvoiced sounds have fast variations of 0.2 to 0.01 milliseconds, and the sound type can be determined thereby. The inventive method includes discriminating voiced and unvoiced sounds by any means including analog and digital processing, in the time domain or the frequency domain. The preferred method is time-domain digital processing since this involves the least hardware, is extremely fast, provides reliable recognition, and can be implemented with a cheap microcontroller.

The time domain waveform analysis to determine the sound type will be described in some detail since it is novel. First, the voiced sound is detected by adding or averaging a number Nslow of sequential digitized signal values together. The resulting sum or average may be termed a slow-wave signal since it emphasizes the slow variations of voiced sound, while extinguishing the rapid variations of unvoiced sound. Preferably Nslow is chosen to span about 1 millisecond, which is sufficient to detect most of the voiced sound variations while excluding unvoiced sounds.

Unvoiced sounds are detected by subtracting each value of the digitized signal from the immediately preceding value or, equivalently, from the next proceeding value. The result is termed a fast-wave signal, since it emphasizes the fast variations of unvoiced sound while suppressing the slow variations of voiced sound. Preferably the ADC is fast enough to digitize the rapid variations. Typically an ADC digitization period of 0.03 to 0.1 milliseconds will suffice, with 0.06 milliseconds being ideal. If the ADC operates faster than this range, alternating values of the digitized signal may be averaged or ignored, so as to obtain the desired periodicity. If the ADC is slower than the preferred range, then the detection of unvoiced sounds will suffer.

The slow-wave and fast-wave signals are strongly indicative of the slow variations and fast variations of the sound, and therefore indicative of the voiced and unvoiced sounds respectively. Voiced sound may be detected by comparing the slow-wave signal to a slow-wave threshold, and unvoiced sound may be detected by comparing the fast-wave signal to a fast-wave threshold. Since sound has both positive and negative variations, each signal may be compared to two threshold values, a positive and a negative threshold relative to silence. When either the slow-wave signal or the fast-wave signal first exceeds its respective threshold, (a) the sound beginning time is thereby determined, and (b) the sound type is also determined, depending on which of the signals has exceeded its threshold. Thus the inventive method provides both the time of the leading sound, and the type of the leading sound, in the trigger command. The threshold crossing time then triggers an immediate responsive action, and the sound type determines which responsive action is to be performed. Importantly, the sound type and start time are both determined simultaneously and immediately at the start of the command. Thus the inventive method, by triggering the responsive action as soon as the leading sound type is detected, provides a responsive action that is immediate, yet that depends on which command is spoken.

The slow-wave and fast-wave signals exhibit wild amplitude fluctuations, due to normal waveform variations as well as personal vocal effects. To enhance detection reliability, and to simplify downstream processing, the inventive method may include steps for processing or smoothing of the sound signals to reduce fluctuations. First, a baseline value, corresponding to silence, is subtracted from each of the slow-wave values, and then the result is rectified (that is, the digital magnitude is found, usually by dropping the sign). The result is termed the rectified-slow-wave signal. Then a plurality Nsmooth of the rectified-slow-wave values are averaged or otherwise combined to obtain a smoothed-slow-wave signal. The smoothed-slow-wave signal reliably indicates the presence of voiced sound when compared to a voiced-sound threshold. However, the response is slightly delayed due to the additional processing time.

The rectified-fast-wave signal is obtained by simply rectifying the fast-wave signal; there is no need to subtract a baseline from the fast-wave signal. Then, Nsmooth rectified-fast-wave values are averaged to obtain a smoothed-fast-wave signal, which reliably indicates unvoiced sound when compared to an unvoiced-sound threshold. The smoothing may comprise a rectangular or sliding-boxcar average, or the magnitude values may be multiplied by a weighting function and then averaged. For example a wedge-shaped weighting function may be applied, thereby emphasizing the most recent values, which slightly shortens the response time. The smoothed signals have far less fluctuation than the precursor signals. Also, the smoothing suppresses noise spikes, provides a more reliable determination of sound type, and comprises a more reliable trigger criterion for the responsive action.

To summarize the preferred time-domain signal analysis steps in the inventive method: First, the electronic signal is amplified and digitized. Then, to detect voiced sound, a plurality of successive digitized signal values are added or averaged, forming a slow-wave signal; then a silence baseline is subtracted, and the magnitude of that difference forms the rectified-slow-wave signal; and then a plurality of the rectified-slow-wave values are averaged to form the smoothed-slow-wave signal, which is then compared to a voiced-sound threshold to detect voiced sound. Unvoiced sounds are detected by subtracting subsequent values of the digitized signal from each other, thereby forming the fast-wave signal; which is rectified, thus forming the rectified-fast-wave signal; and then a plurality of those values are averaged to form the smoothed-fast-wave signal, which is compared to an unvoiced-sound threshold to detect unvoiced sound.

It may be noted that the waveform analysis method includes two different averaging steps, with very different outcomes. First, when the Nslow digitized samples are averaged to form the slow-wave signal, this step excludes the unvoiced sounds. Later, in the smoothing step, when Nsmooth of the rectified signals are averaged to generate the smoothed-slow-wave and smoothed-fast-wave signals, the sound-type information in each signal remains unchanged. These two averaging processes have different outcomes because of the crucial rectification step. When the slow-wave and fast-wave signals are rectified, the rectification step effectively "locks in" the sound type information in the rectified-slow-wave and rectified-fast-wave signals. The subsequent smoothing merely levels out the fluctuations without diluting the sound-type information. More specifically, the initial Nslow averaging uses as input the digitized signal which is a bipolar signal relative to silence, and any variations with a duration shorter than the Nslow averaging span will be cancelled by the bipolar variations, and effectively eliminated from the slow-wave signal; hence only the slow variations remain. In the smoothing step, on the other hand, the input signals are not bipolar; they are the rectified-slow-wave and rectified-fast-wave signals, which are positive-definite signals. Since the input to the smoothing step is a positive-only rectified signal, the smoothing merely reduces the wild fluctuations of normal speech sounds, but does not change the sound-type information.

Another difference between the Nslow and Nsmooth averaging steps is that the span of the slow-wave averaging is preferably only as long as the shortest of the voiced sound variations, which is about 1 millisecond, but the span of the smoothing step should be at least comparable to the duration of speech fluctuations, which is typically 20 milliseconds or longer depending on voice properties and application needs.

For any application, there will be a compromise between the response speed versus the likelihood of misidentifying the sound type or triggering on noise. This compromise may be optimized by adjusting threshold settings and analysis parameters such as Nsmooth. Typically the thresholds are adjusted to be significantly higher the noise level so that a false trigger occurs infrequently, if at all. The smoothing span should not be longer than the shortest speech sound that is to be detected, since brief sounds will be suppressed if the smoothing span is longer than the sound duration. On the other hand, brief sounds are often unreliable and not useful for command recognition, in which case the smoothing span may be chosen longer than those undesired brief sounds, thereby excluding them from the smoothed signals. Furthermore, the smoothing span may be different for the voiced and unvoiced sounds; this is useful if one sound type triggers an immediate response and the other type does not.

According to the inventive method, the responsive action is initiated when a sound signal exceeds a predetermined threshold. The sound signal may be any analog or digital signal representing the command sound in the time domain or the frequency domain. The most preferred triggering options are as follows: (1) A responsive action may be initiated when the digitized signal exceeds an amplitude threshold. This comprises single-wave triggering, which provides the fastest time response but has the least reliability, since any noise spike could trigger the response. (2) A responsive action may be triggered on the slow-wave or fast-wave signals, or on their magnitudes. Such sound-type triggering imposes a slight delay in the response due to the sound-type detection, but it reveals the leading sound type of the command, so that different responsive actions can be selected accordingly. (3) As a further alternative, which may be termed smoothed-sound-type triggering, a responsive action may be triggered on one of the smoothed signals. This results in a slightly longer delay due to the Nsmooth averaging step, but greatly reduces noise and false triggering.

The inventive method includes steps for parsing and recognizing a command. According to the inventive method, the various sounds in the command are identified by analyzing the sound signal to determine whether each sound is voiced or unvoiced, thereby determining the order of voiced and unvoiced sound intervals in the command, and then comparing the order of sound types in the spoken command to the order of sound types in each of the predetermined commands. Any silent intervals in the spoken command may also be detected and included in the comparison, to further sharpen the command identification. If the spoken command and the predetermined command have exactly the same order of sound types, the spoken command is thereby identified, and a responsive action associated with the matching predetermined command may then be initiated. However, such a responsive action would necessarily occur after the command has been finished and parsed, and therefore would not be an immediate response. Although non-immediate command responses are not suitable for precision timing, they serve many useful purposes that do not require speed, such as setting a parameter. Normally the arming command is a non-immediate command since its response (setting the arming parameter) occurs after the full command has been spoken and analyzed.

As an example, the command "RESET" can be identified by its sound-type order. "RESET" begins with the voiced RE portion, then the unvoiced S is sounded, then the voiced E is sounded, then a brief rapid-variation interval for the unvoiced T. Or, more concisely, voiced-unvoiced-voiced-unvoiced. If the spoken command includes exactly the same order of voiced and unvoiced intervals as the predetermined command "RESET", then the spoken command is thereby identified. Preferably each predetermined command is short, ideally just 1 to 3 syllables, since voice-activation operators find long commands tedious. However the inventive method can recognize commands of any length, with appropriate programming of the predetermined command set.

The inventive method includes selecting a particular responsive action to be initiated, depending on the starting sound type in the trigger command. For example two commands "GO" and "SET" are easily discriminated using the inventive method, since the former begins with a voiced sound and the latter begins with the unvoiced S sound. If the operator calls "GO", the starting interval is immediately detected as voiced, and the corresponding responsive action is immediately initiated, such as emitting a pulse. If the operator calls "SET", the starting interval is immediately detected as unvoiced and a different responsive action is initiated, such as setting a parameter. In some applications, a command starting with one sound type generates a fast immediate responsive action, while those starting with the other sound type do not.

As a second example of sound-type triggering, a voice-activated signal generator may generate an output voltage which is either a positive voltage or zero volts, corresponding to a logical 1 or 0. The signal generator may recognize two trigger commands, "HIGH" which begins with the unvoiced H sound, and "LOW" which begins with the voiced L sound. Upon detecting the unvoiced initial H sound in "HIGH", the device immediately sets the output to the higher voltage state. Upon detecting the initial voiced L sound in "LOW", it immediately sets the output back to ground. Thus the device selects which responsive action is to be initiated, depending on whether the starting sound of the trigger command is voiced or unvoiced. In this example, both the leading-voiced and leading-unvoiced commands generate a fast responsive action, although it is a different action for the two sound types.

As an intriguing example of the versatility of the inventive method, the arming command can also serve as the trigger command. The operator can then call the arming command repeatedly to obtain the fast response at will. For example, an application may recognize "SET" as the arming command, and may initiate the fast responsive action upon any command starting with an unvoiced sound, after being armed. Then the operator could simply call out "SET . . . SET . . . SET . . . SET" to get a series of fast responses, each response precisely timed to the beginning of each command. In this sequence, the first command sets the arming parameter to the armed state but produces no responsive action, since the arming parameter is initially non-armed. Then the second command triggers a responsive action immediately, and again sets the armed state. Then the third command does the same thing. This continues likewise as long as the operator continues calling the arming command. When finished, the operator speaks another sound, such as "DONE", to end the sequence and return the arming parameter to the non-armed state. Thus the operator can conveniently obtain a series of prompt responses while calling only the arming command at each moment the fast response is needed.

As a further alternative, the application could have two different arming commands and two different operating modes. Depending on which arming command is called, one of the operating modes would then be activated. Different responsive actions could also be initiated, depending on whether the trigger command was or was not preceded by the arming command, and depending on the starting sound type of the trigger command, and different responses could be provided according to the specific commands called in each case. Furthermore, by modulating operational modes according to the particular arming command, the subsequent responsive action may be further controlled. These examples, and others even more intricate, show that the inventive method enables a rich diversity of triggering and response options, all controlled with precision timing according to the operator's voice commands.

The invention includes adjusting parameters responsive to the arming command, the trigger command, and other commands. For example, the arming command could cause the predetermined threshold to be lowered, thereby obtaining faster responsiveness when the trigger command is subsequently called. Preferably the predetermined threshold is then restored to its normal, higher value following the trigger command, so as to avoid interference from noise. The arming command itself may include information indicating whether the predetermined threshold, or other parameters, should be so adjusted, and by how much.

The thresholds may be modulated by "threshold hysteresis" wherein a threshold is reduced as soon as a sound is detected, and remains low as long as the sound continues, reverting to the higher threshold value after the sound is finished. Threshold hysteresis provides detection continuity, without excessive noise sensitivity. The thresholds may also be adjusted automatically to compensate for a noisy background. For example, the average sound level could be monitored between commands, and the thresholds could be raised if the background noise is high. Or, a manually adjustable control such as a potentiometer could be provided, with the thresholds being adjusted according to the potentiometer setting. Special commands, other than the arming and trigger commands, may cause the thresholds to be increased or decreased.

The inventive method thus enables a multitude of voice-activated sparse-command applications demanding fast responses with tight timing constraints. Many other applications and variations will become apparent to those skilled in the electronic arts when they develop products incorporating the inventive method.

DETAILED DESCRIPTION OF INVENTION

Figure 1:
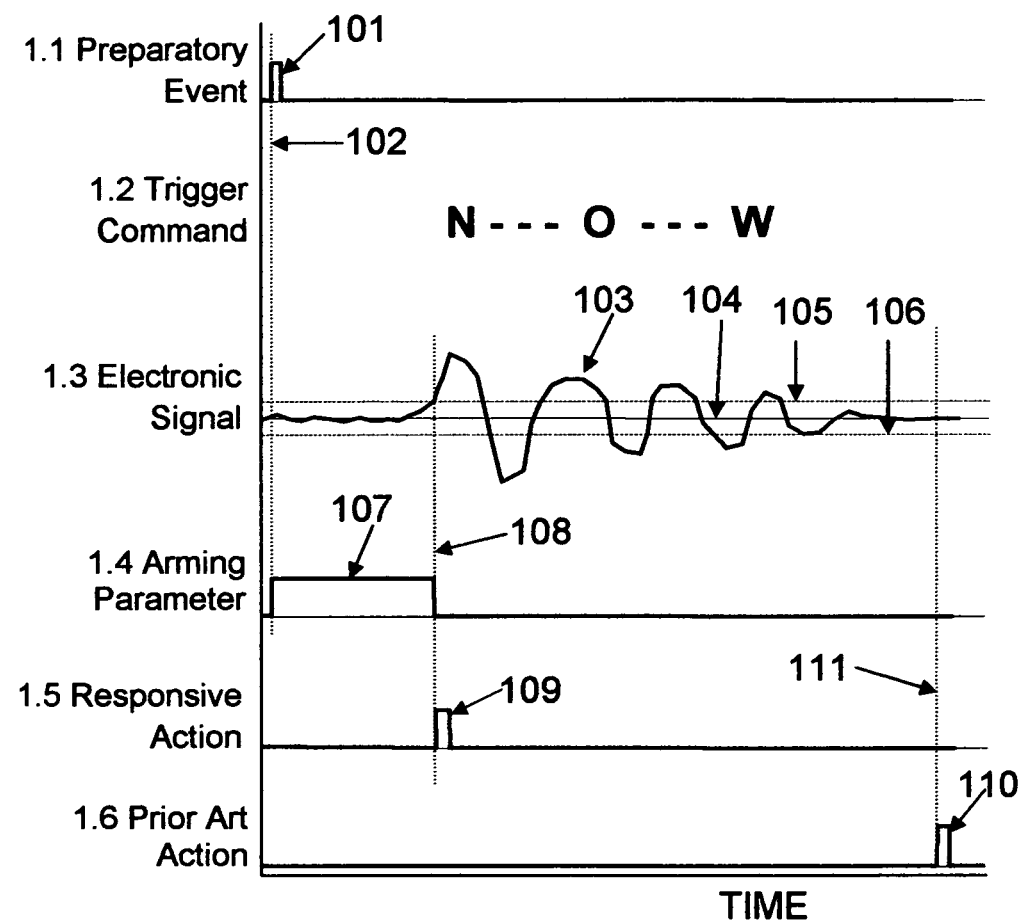
FIG. 1 is a set of graphs showing the inventive analysis of the command word "NOW".

FIG. 1 shows a set of sketches as graphs, similar to oscilloscope traces, that schematically display various signals versus time. The signals are related to the inventive processing of a command, and production of the responsive action. The spoken trigger command is the word "NOW". This command is useful in many sparse-command applications, for example to trigger a pulse or a measurement with user-controlled timing. Generally the operator desires the responsive action to be initiated immediately at the starting time of the trigger command, and not at some later time. Accordingly, the example of FIG. 1 initiates the responsive action immediately upon the first sound of the trigger command following the preparatory event. This is an example of single-wave triggering since the responsive action is triggered upon an undifferentiated sound amplitude without regard to the sound type.

In FIG. 1, the first trace labeled "1.1 Preparatory Event" shows the preparatory event 101 as an input pulse, which is received at a time 102 indicated by a vertical dotted line. Alternatively, the preparatory event 102 could be an arming command or a button press for example.

In the section labeled "1.2 Trigger Command", the spoken trigger command itself is shown with the letters N-O-W spread out so that they correspond temporally to the other traces. The trigger command is spoken after a short delay following the preparatory event 101. The delay comprises a silent interval extending from time 102 to time 108.

In the trace "1.3 Electronic Signal" a sound signal 103 representing the command sound is displayed versus time. The sound signal 103 could be the amplified analog microphone signal voltage, or it could be the digitized signal values plotted versus time; they both look the same at the resolution of the sketch. Also shown is a line 104 representing silence. A positive threshold 105 and a negative threshold 106 are shown as dashed lines. The negative threshold 106 may or may not be a negative value, depending on how the sound signal 103 is biased. In some systems, all voltages are biased positive relative to ground, and all the digitized signal values are positive numbers. In that case the negative threshold 106 is negative relative to silence 104, but positive relative to ground. At time 108 the sound signal 103 first exceeds the positive threshold 105.

The sound signal 103 exhibits relatively slow variations corresponding to the voiced sound of the "NOW" command. Since all the letters of the command are voiced, the entire command word comprises a single uninterrupted interval of voiced sound. It should be understood that the waveform sketched in FIG. 1 is very, very highly simplified to illustrate the principles of the invention. Any real command would have a much more complex waveform with hundreds or thousands of chaotic variations. Despite such complexity, however, the inventive method reliably extracts both timing and sound-type information.

Trace "1.4 Arming Parameter" shows the arming parameter 107 which is initially in the low or non-armed state, but is set armed upon the preparatory event 101 at time 102.

Trace "1.5 Responsive Action" shows a pulse 109 representing the responsive action. According to the inventive method, the responsive action pulse 109 is initiated immediately when the sound signal 103 crosses either of the thresholds 105 or 106, which occurs at time 108. Importantly, the responsive action pulse 109 is initiated at the beginning of the command, upon the leading edge of the first significant sound variation, thereby providing the fastest possible response and the tightest possible timing. Also, the arming parameter 107 is returned to the non-armed state after the responsive action pulse 109 is initiated.

Trace "1.6 Prior Art Action" shows a pulse 110 generated by prior art methods wherein a responsive action occurs only after the entire command has been received and processed for speech interpretation, and after other inexplicable delays, and then finally providing the desired pulse 110 at time 111. Due to these delays, the prior-art pulse 110 comprises neither a prompt response nor an acceptable time mark for a transient-event application; it is late, it is skewed by the unpredictable effects just listed, and it is far too uncertain for any serious timing application. The inventive pulse 109, on the other hand, is perfect for test and measurement applications because the inventive pulse 109 is extremely prompt, has predictable sharp time resolution, and occurs exactly when the operator commands it.

Figure 2:
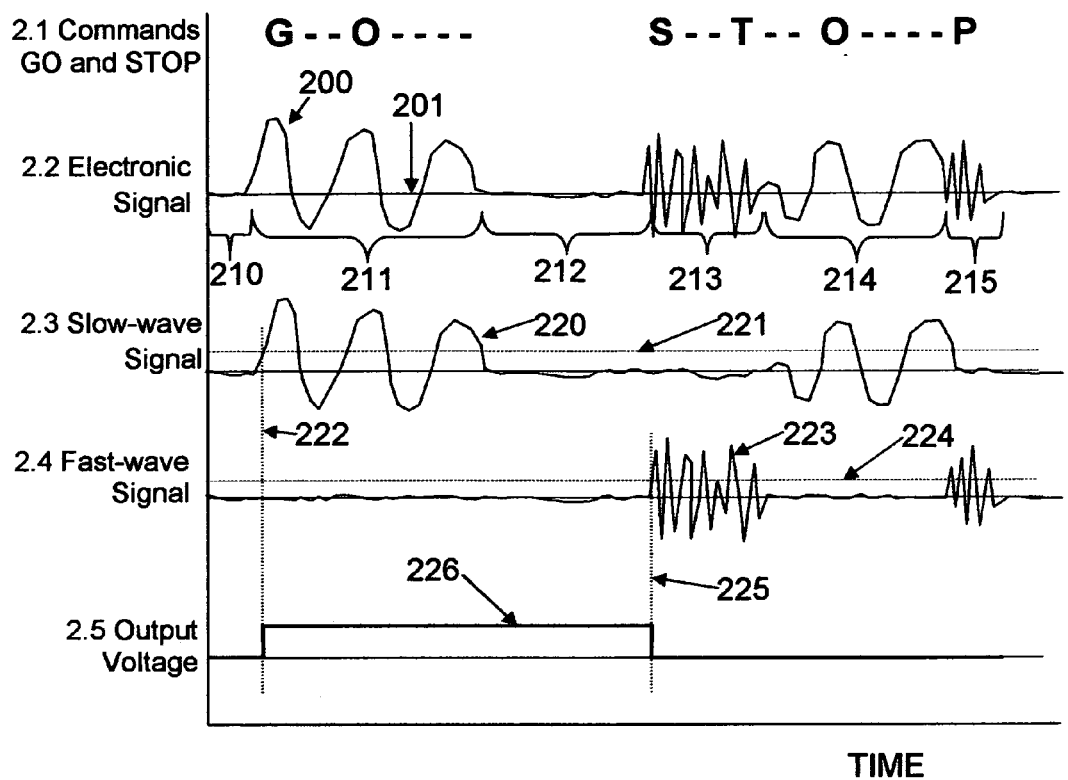
FIG. 2 is a set of graphs showing command analysis including two different responsive actions that depend on the sound type.

Proceeding to FIG. 2, a set of graphs shows various signals for analyzing the two commands "GO" and "STOP". In the example of FIG. 2, different responsive actions are initiated, based on whether the commands begin with voiced or unvoiced sounds. Thus FIG. 2 is an example of sound-type triggering. For a command beginning with a voiced sound, the responsive action is to produce a positive output voltage, and for an unvoiced sound, it is to set the output voltage to zero. The inventive method detects the leading edge of the starting sound of each command, and also determines its sound type, and then produces a positive output voltage if the initial sound is voiced, as in "GO", and sets the output to zero volts if it is unvoiced, as in "STOP". Each response occurs at the leading edge of the command sound, as soon as the voiced or unvoiced sound first exceeds its respective threshold. The leading sound is preceded by a period of silence, and this silence is how the leading sound of each command is recognized as the leading sound of a new command. After responding to the leading sound of each command, the rest of the command sounds are discarded. Also in FIG. 2 the arming parameter (not shown) is assumed to be armed by a previous preparatory event (not shown), and remains armed throughout the time of FIG. 2.

The command words are shown in the section labeled "2.1 Commands GO and STOP", with the letters spread out. Various times are indicated by vertical dotted lines.

Trace "2.2 Electronic Signal" shows the digitized signal 200 corresponding to the sounds of the commands, relative to silence 201. Six regions are demarked: region 210 is a silent interval before the "GO" command, region 211 includes the slow variations of the voiced sound for "GO", region 212 is a silence between the two commands, region 213 includes the unvoiced fast variations of S and T together, region 214 is the voiced sound of O, and region 215 is the unvoiced sound of P. The silent interval 210 is important since it indicates that any prior commands are finished and the subsequent voiced sound in region 211 is the start of a new command. The silent interval 212 is important since it indicates that the first command has finished, so that the subsequent unvoiced sound region 213 is known to be the leading sound of a second command.

Trace "2.3 Slow-wave Signal" shows the slow-wave signal 220 derived by averaging Nslow values of the digitized signal 200. For the example of FIG. 2, the ADC digitizes one value per 0.06 millisecond, and the number of values Nslow is 16, resulting in an averaging span of about 1 millisecond. The resulting slow-wave signal 220 closely matches the slow variations in the digitized signal 200, since voiced sounds with variation times of 1 millisecond or longer are readily passed by the averaging step. The variations in trace 220 also have a slight phase shift relative to those in the digitized signal 200, due to the processing, but the shift is so small as to be barely discernible on the time scale of the figure. All of the fast variations in the digitized signal 200 from unvoiced sounds in regions 213 and 215 are excluded from the slow-wave signal 220, since the averaging is sufficient to cancel out all bipolar variations having a range of about 0.2 millisecond or less.

Also shown is a slow-wave threshold 221. Usually a negative threshold would also be tested, but for simplicity only one threshold 221 is shown. At time 222, the slow-wave signal 220 first exceeds the slow-wave threshold 221, the sound of the "GO" command is thereby detected and is known to be a voiced sound. Thus at time 222 it has been determined that (a) a command sound has begun, (b) the starting time is time 222, and (c) it is a voiced sound.

Trace "2.4 Fast-wave Signal" shows the fast-wave signal 223 obtained by subtracting sequential values of the digitized signal 200, thereby emphasizing the fast variations of unvoiced sounds while suppressing the slow variations of voiced sounds. Accordingly, the unvoiced intervals of the ST sound and the P sound of "STOP" are prominent in the fast-wave signal 223. Also shown is a fast-wave threshold 224. The fast-wave signal 223 first exceeds the fast-wave threshold 224 at time 225. The silent time 212 is long enough to indicate that the first command has finished. Therefore, the sound in region 213 is known to be the start of a second command. At time 225, it has been determined that (a) a second command has begun, (b) the time 225 is the second command's starting time, and (c) the initial sound of the second command is unvoiced.

As mentioned, the silent intervals in regions 210 and 212 indicate that prior commands are finished and the next sound is the leading sound of a new command. The inventive method includes measuring the duration of such silent intervals and comparing them to the required duration Sinitial. No commands are accepted until the Sinitial requirement has been met. Preferably Sinitial is longer than any expected silent intervals occurring internal to any predetermined command, such as the silence separating two words in the arming command "GET SET". A silent interval may be identified according to any criterion related to the absence of sound; for example, a silent interval may be recognized as any interval that does not contain a voiced or unvoiced interval, or a silent interval may be any interval wherein the digitized signal 200 does not exceed an amplitude threshold.

Trace "2.5 Output Voltage" shows an output voltage 226 that can be set to a positive value or to ground, responsive to the commands. The output voltage 226 is set high upon a command starting with a voiced sound such as "GO", and is set to ground responsive to a command starting with an unvoiced sound such as "STOP". In each case, the output voltage 226 is changed immediately as soon as the leading sound of each command is detected. Thus the output voltage 226 goes high at time 222 responsive to the leading edge of the voiced "GO" sound which is detected when the slow-wave signal 220 exceeds the slow-wave threshold 221. Then at time 225 the fast-wave signal 223 of "STOP" first exceeds the fast-wave threshold 224, and the output voltage 226 is responsively set to zero (ground). Importantly, those output changes occur as early in each command as possible, thereby providing a very prompt response that depends on the detected sound type. The example of FIG. 2 shows that two commands with different leading sound types can generate two different responsive actions, namely the raising and lowering of the output voltage, according to the initial sound type of each trigger command, and each responsive action occurs with fast leading-edge timing.

It may be noted that the command "STOP" includes a voiced interval in region 214 corresponding to the O sound in region 214, yet the output voltage 226 does not go high when the voiced sound in region 214 is detected. That is because according to the inventive method the responsive action is triggered only by the leading sound in a command. The voiced sound in region 214 is not preceded by silence, and therefore is not the leading sound in a command. By observing silent intervals, the inventive method determines which sounds are the leading sounds in each command and which sounds are internal to a command, and then initiates the responsive action only upon the leading sounds.

As an alternative, the commands of FIG. 2 could be analyzed in the frequency domain. Frequency analysis could use analog electronics, wherein the microphone signal is amplified in two frequency passbands, one for voiced sounds in the roughly 30-1000 Hz band and another passband for unvoiced sounds in the roughly 3000-20000 Hz band. The resulting filtered signals would be similar to the slow-wave and fast-wave signals 220 and 223 for voiced and unvoiced sounds respectively. Or, the high and low frequency bands could be derived from the digitized signal by calculating the spectrum with software such as an FFT program and then selecting high and low frequency portions of the spectrum. In that case, waveforms reconstructed from the digital low-frequency and high-frequency spectral ranges would also resemble signals 220 and 223. The subsequent processing steps, imposing threshold criteria and generating the responsive action and so forth, would then proceed identically regardless of whether the sound-type determination was carried out in the frequency or time domain.

As a further option, either of the trigger commands could also have a non-prompt responsive action (not shown) which would occur after the command is finished and parsed. In that case the command would initiate two actions, a fast immediate responsive action upon the leading sound of the command, and then a second non-prompt action after the command is finished. For example, the application could recognize two trigger commands "SET" and "STOP". Both of these commands start with unvoiced sounds, and thus both of them would provide the same fast responsive action upon the S sound, which is to immediately ground the output voltage 226. And then, after observing and identifying the whole command, a non-prompt command-specific response would then be carried out, and it would depend on which trigger word was spoken. If the command were the "SET" command, then the application would set a parameter; and upon "STOP" it would stop accepting commands until being reset, for example. Both trigger commands produce the same prompt response, but then they produce two different non-prompt operations depending on which trigger command is recognized. The trigger command thus serves multiple purposes; (a) the leading edge of the command determines the time of the fast response, (b) the leading sound type determines the type of the fast response, and (c) the rest of the command determines which non-prompt response is then carried out after the command is finished.

Figure 3:
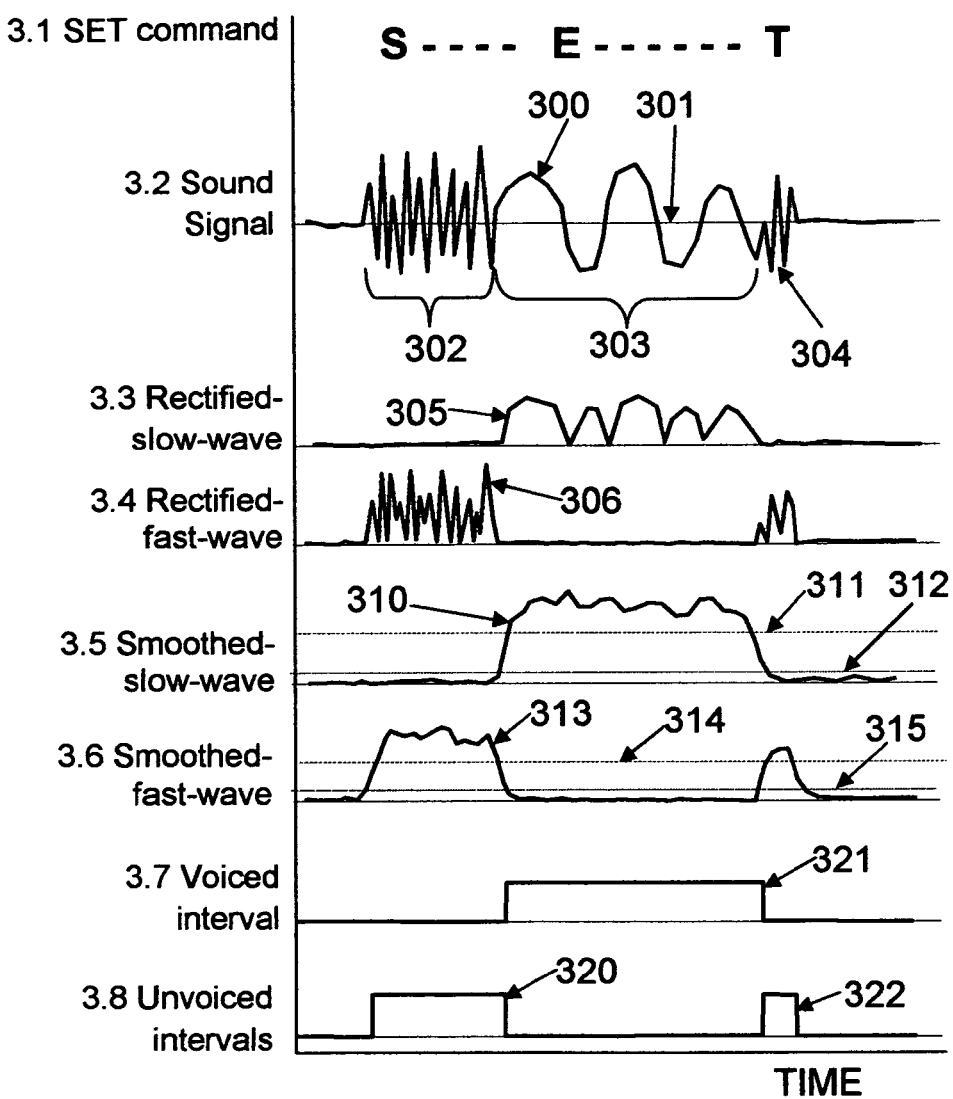
FIG. 3 is a set of graphs showing command analysis including smoothing and command identification.

Turning now to FIG. 3, a set of signals illustrates how the inventive method enables the identification of a spoken command "SET" by comparing the sound to a set of predetermined commands. As mentioned, the predetermined command "SET" comprises an unvoiced S sound, followed by a voiced E sound, followed by an unvoiced T, or unvoiced-voiced-unvoiced. The analysis shows that the command has the same sound type intervals in the same order as the predetermined command "SET", and thus is identified as the "SET" command.

In trace 3.1 the letters of the spoken command are shown spread out. Trace "3.2 Sound Signal" shows the digitized signal 300 for the spoken command and for silence 301. Also indicated are an unvoiced sound region 302 of the S sound with fast variations, then the voiced region 303 of the E with slow variations, and the brief unvoiced region 304 of the T.

Trace "3.3 Rectified-slow-wave" shows the rectified-slow-wave signal 305 obtained by adding or averaging Nslow values of the digitized signal 300, subtracting a value representing silence 301, and then rectifying the result. The rectified-slow-wave signal 305 essentially transcribes the slow variation region 303, but with negative portions rectified into positive values. In trace "3.4 Rectified-fast-wave" the rectified-fast-wave signal 306 is shown, comprising the rectified difference between subsequent values of the digitized signal 300. The unvoiced sounds of the S and T, regions 302 and 304 respectively, are prominent in the rectified-fast-wave signal 306, since those regions contain fast variations in the sound signal 300.

Traces "3.5 Smoothed-slow-wave" and "3.6 Smoothed-fast-wave" show the smoothed-slow-wave signal 310 and the smoothed-fast-wave signal 313 respectively, which are obtained by averaging the rectified-slow-wave signal 305 and the rectified-fast-wave signal 306 respectively across an averaging span of Tsmooth, which in the case of FIG. 3 is 20 milliseconds. The smoothed signals 310 and 313 exhibit far less amplitude fluctuations than the rectified signals 305 and 306, as expected since the smoothed signals 310 and 313 combine Nsmooth data values. The two smoothed signals 310 and 313 clearly distinguish between the two sound types. Also shown are a voiced-sound threshold 311, a lower-voiced-sound threshold 312, an unvoiced-sound threshold 314, and a lower-unvoiced-sound threshold 315 as dashed or dotted lines.

The traces "3.7 Voiced interval" and "3.8 Unvoiced intervals" show the detected sound intervals. First an unvoiced interval 320 is detected when the smoothed-fast-wave signal 313 exceeds the unvoiced-sound threshold 314, and continues until the smoothed-fast-wave signal 313 drops below the unvoiced-sound threshold 314. Thus the unvoiced interval 320 is due to the S sound of region 302. Then, the E sound in region 303 is detected as a voiced interval 321, during which the smoothed-slow-wave signal 310 remains above the voiced-sound threshold 311. And then an unvoiced interval 322 corresponding to the T sound in region 304 is detected, due to the smoothed-fast-wave signal 313 again exceeding the unvoiced-sound threshold 314. The spoken command sequence is thus determined as unvoiced-voiced-unvoiced, which matches the sequence of the predetermined command "SET". By following the inventive method, and using only the sound of the spoken command as input, the spoken command has been successfully identified as the "SET" command.

The analysis of FIG. 3 could alternatively be performed in the frequency domain. The frequency analysis could be performed using analog or digital techniques. To separate the voiced and unvoiced sounds using analog frequency discrimination, a pair of rectifying bandpass amplifiers could be arranged by placing a low-capacitance diode across a high-gain-bandwidth amplifier in parallel with frequency-selecting components such as resistors and capacitors. The two amplifiers would output two waveforms that include only the low and high frequency components in the sound. Those waveforms would resemble the rectified-slow-wave signal 305 and the rectified-fast-wave signal 306 (although the highest frequency portion of the unvoiced sounds could be lost if common opamps were used for this purpose). Then, in a subsequent integration stage, smoothed signals resembling the smoothed-slow-wave signal 310 and the smoothed-fast-wave signal 313 could be obtained. In addition, the thresholds 311 and 314 could be tested using two voltage comparators, and the comparator outputs would resemble the voiced and unvoiced intervals 320, 321, and 322. Thus analog electronics for bandpass rectification, integration, and detection can discriminate sound types most of the time, although it would take more hardware than the preferred time domain digital method.

Alternatively, the frequency analysis could be performed digitally by processing the digitized signal with FFT program for example, and then extracting the spectral power density or other measure of integrated sound in low-frequency and high-frequency bands. The resulting spectral density signals would resemble the smoothed signals 310 and 313. Although more demanding of processor power and available memory space than the preferred time domain technique, digital frequency analysis is able to separately detect the sound types in for most commands.

Optionally, the method includes adjusting the threshold settings. The adjusting may be in response to certain commands, or to manual controls, or to ambient noise, or to other inputs. Traces 3.5 and 3.6 show two such thresholds, the lowered-voiced-sound threshold 312 and the lowered-unvoiced-sound threshold 315. In general, lower thresholds result in faster detection of sound, faster recognition of sound type, and improved time resolution of the responsive action, but greater noise sensitivity. It is apparent from the smoothed signal trace 310 that the lowered-slow-wave threshold 312 is breached before the regular threshold 311. Likewise the smoothed-fast-wave signal 313 exceeds the lowered-fast-wave threshold 315 before the regular threshold 314. Thus the lowered thresholds 312 and 315 can provide faster sound detection. Also, the risetime of the smoothed signals 310 and 313 depends on the sound amplitude and other characteristics; therefore an earlier detection using the lowered thresholds 312 and 315 will result in reduced time uncertainty.

Triggering on the smoothed signals will introduce a small delay in the responsive action, typically a few milliseconds or less if the voiced sounds are loud enough that the smoothed signals quickly exceed their respective thresholds. Such a small delay is inconsequential for many applications, and the response is effectively immediate. However, if an application requires even faster responses, it may be more appropriate to trigger on the rectified-slow-wave signal 305 or the rectified-fast-wave signal 306, instead of triggering on the smoothed signals 310 and 313. Or, if the fastest response is needed and sound-type is not important, then the responsive action may be triggered on the digitized signal 300 itself, in a manner as shown in FIG. 1. The inventive method provides all of these triggering options, and many others that may be derived therefrom, the best choice depending on the relative importance of fast response, noise immunity, and sound-type triggering.

The inventive method includes adjusting a variable threshold based on whether the arming parameter is armed or non-armed, and then using the variable threshold to detect a particular sound or sound type. For example, the variable threshold may be set to a higher value, such as the thresholds 311 and 314, while the arming parameter is non-armed. Then, when the arming command is received, the variable threshold is set to a lower value such as the lowered thresholds 312 and 315, to ensure a fast response to the trigger command. Then as soon as the sound signal exceeds the (lowered) threshold, the responsive action is immediately initiated, and the variable threshold is again set back to the higher value 311 or 314, to avoid noise sensitivity. Thus, the variable threshold is set equal to a higher value while the arming parameter is non-armed, and is set to the lower value when the arming parameter is armed. The variable threshold remains low only for the short time between the arming command and the trigger command. Setting the variable threshold to the higher value when non-armed ensures higher reliability in command parsing and identification, and using the lower threshold value when armed ensures a faster responsive action.

As a further option, a variable threshold may be modulated with hysteresis. Initially the variable threshold is set to a higher value such as the thresholds 311 and 314. Then at the beginning of a sound, when the smoothed signal 310 or 313 exceeds the higher variable threshold value, the variable threshold is changed to a lower value such as the lowered thresholds 312 and 315. The variable threshold remains low as long as the sound continues. Then, after the sound signal 310 or 313 passes below the lowered variable threshold value, the variable threshold is again set to the higher value. Thus the variable threshold remains low only while the sound is in progress. Threshold hysteresis provides improved sound detection. The higher initial requirement provides noise immunity, while the lower value provides enhanced sensitivity and continuity during the sound, even if the sound signal is weak or the command is softly spoken.

As a further option, the invention includes checking a manual control such as a potentiometer or a switch, and adjusting a variable threshold accordingly. If the manual control is a switch, the thresholds may be adjusted to the higher threshold values 311 and 314, or the lower values 312 and 315, according to the switch setting. If the control is a potentiometer, a variable threshold can be derived from the potentiometer setting, perhaps using an ADC, thereby enabling the operator to adjust a variable threshold with nearly continuous adjustability.

As yet another option, the invention includes steps to monitor the ambient noise level and adjust thresholds in response. This would be particularly useful for fine-tuning the lowered thresholds 312 and 315 to ensure that they remain above the noise level despite changing backgrounds. To do so, the application would preferably average only those faint sounds occurring between the command sounds, and not the command sounds themselves. This can be accomplished by subtracting a silence baseline from the digitized signal, rectifying the result, and then averaging with a long span of 5 to 10 seconds or more. Preferably the command sounds are excluded from the background average, by skipping any digitized signal that exceeds an amplitude threshold, or by excluding the digitized signal whenever a voiced or unvoiced interval is present. The background average represents the noise level, and the lowered thresholds can be adjusted accordingly. Usually the lowered thresholds are set about 2 or 3 times the observed background average, although this may be application-dependent.

Figure 4:
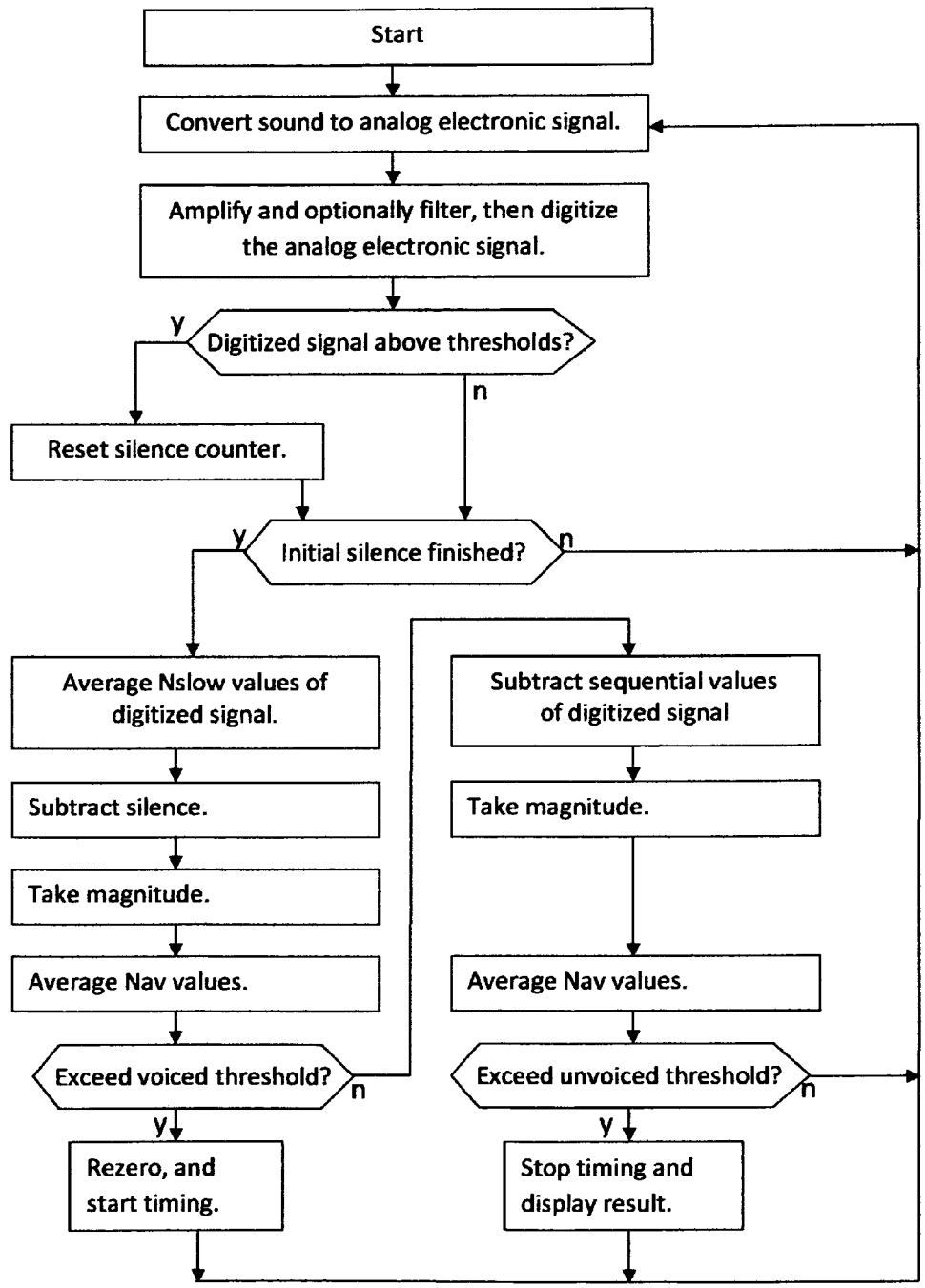
FIG. 4 is a flowchart showing how different responsive actions may be initiated depending on the command sound type.

FIG. 4 is a flowchart showing how, using the inventive method, an application can select a different responsive action depending on whether the leading sound of the trigger command is voiced or unvoiced. The envisioned application is a voice-activated stopwatch. The stopwatch starts timing when the operator says "GO" or any other command beginning with a voiced sound. The stopwatch stops timing when the operator says a command starting with an unvoiced sound such as "STOP", and then the stopwatch displays the time interval between the two commands. Typically a digital stopwatch measures time intervals by counting a periodic clock signal, and the resulting count is then displayed. For the example of FIG. 4, the preparatory event is assumed to have already occurred, and the arming parameter is kept armed throughout the example.

The stopwatch requires a silent period before accepting any command. An initial silent period of a certain duration, for example 100 milliseconds, may be measured using a counter termed a silence counter. The silence counter is incremented each millisecond, and is re-zeroed if there is any sound. Specifically, the silence counter is re-zeroed whenever the digitized signal exceeds one of the thresholds. Then, when the silence counter finally reaches the required silence duration with no further sound detected, the initial silence requirement has been met.

In the flowchart of FIG. 4, the sound of the spoken command is first converted to an analog electronic signal by a microphone, then is amplified by an amplifier, and then digitized by an ADC, thereby producing the digitized signal. Then, in the decision box "Digitized signal above thresholds?", each value of the digitized signal is compared to two thresholds corresponding to positive and negative excursions of the digitized signal relative to silence. If the digitized signal exceeds either threshold, the silence counter is reset to zero which means that the Sinitial period must start over.

Then, in the decision box labeled "Initial silence finished?", the silence counter is checked to see if it has reached the required silence duration. If the silence requirement has not been met, the flow returns to the initial step, to convert more sound. If the silence requirement has been met, which is the "y" branch of the "Initial silence finished?" box, then the sound is analyzed in subsequent boxes to determine if it is voiced or unvoiced sound.

Voiced sounds are detected in the box "Average Nslow values of digitized signal" and the subsequent steps wherein Nslow sequential values of the digitized signal, minus silence, are averaged, and the result is rectified, and that result is then averaged over Nsmooth values comprising about Tsmooth=20 milliseconds of sound, thereby generating the smoothed-slow-wave signal. The smoothed-slow-wave signal is then compared to the voiced-sound threshold in the decision box "Exceed voiced threshold?". If the smoothed-slow-wave signal exceeds the voiced-sound threshold, for example when the operator says "GO", the stopwatch timer immediately starts counting from zero.

If, on the other hand, the sound is not voiced, the flow proceeds through the "n" branch of the "Exceed voiced threshold?" box, and the sound is then tested for unvoiced sounds. In the box "Subtract sequential values of digitized signal" and subsequent steps, an unvoiced sound is detected by subtracting sequential values of the digitized signal from each other, then rectifying and averaging to get a smoothed-slow-wave signal, which is then compared to a voiced-sound threshold in the decision box "Exceed unvoiced threshold?". If the unvoiced signal exceeds its threshold, the command "STOP" is thereby detected, and the stopwatch timer is stopped immediately, and the timed result is displayed. Thus the stopwatch measures the time between the first voiced sound in "GO", and the first unvoiced sound in "STOP".

It is interesting to consider how the stopwatch would respond if the operator repeats the same command twice. If the operator says "STOP" twice sequentially, the stopwatch will stop on the first "STOP", and on the second "STOP" it remains stopped and nothing changes. Thus the second "STOP" has no effect. However, if the operator says "GO" twice, the stopwatch starts over from zero upon the first "GO", and then it starts over from zero again upon the second "GO". Thus the stopwatch measures the time between the last voiced command and the first unvoiced command.

If a different logic is desired, it is straightforward to arrange. For example, upon a voiced sound, the stopwatch timer could be re-zeroed only if it is not already timing; and if it is already timing, the second "GO" would be ignored. Then the measured time interval is the time between the first "GO" and the first "STOP". Alternatively, and preferably, the application could display an error message if either of the commands is repeated, thereby eliminating any ambiguity about what is being timed.

It may be noted that, after the initial silence requirement has been met, the sound is analyzed for sound type even if the digitized signal has not exceeded the amplitude thresholds. That is necessary because the inventive sound-type analysis is sensitive enough to detect sounds that are too low to be detected in the digitized signal itself. Also, the inventive method includes detecting periods of silence. Therefore the sound type analysis is updated with each digitized value, regardless of whether the digitized signal itself exceeds thresholds.

Figure 5:
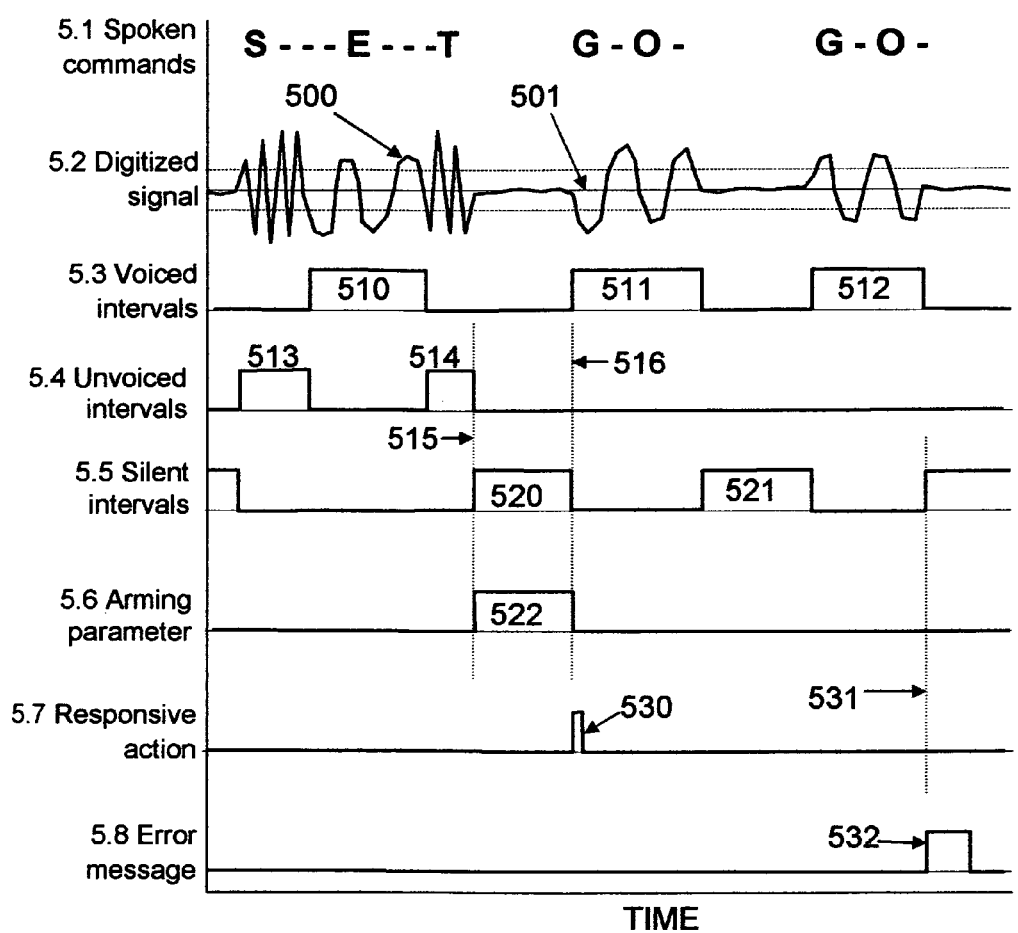
FIG. 5 is a set of graphs showing how the arming parameter is used to obtain a prompt response.

Proceeding to FIG. 5, a set of graphs shows how a preparatory event comprising an arming parameter can be used to provide a fast responsive action. The preparatory event is the arming command "SET". The trigger command is "GO" (or any other command starting with a voiced sound). The arming parameter is set to the armed state when the operator calls "SET". Then the fast responsive action is initiated upon the leading sound of "GO". The method enables parsing and recognition of the arming command, as well as analysis to determine the leading sound-type in the trigger command. The arming command "SET" is recognized because it comprises three sound intervals in the order unvoiced-voiced-unvoiced. If the operator calls the commands in the right sequence, "SET . . . GO", then the arming parameter is armed when the first command is recognized as the arming command, and then a fast pulse output is generated upon the leading edge of the trigger command. But if the operator calls commands in the wrong sequence, such as calling a "GO" when the arming parameter is non-armed, then the fast responsive action is not initiated, and an error message is generated instead.

Across the top of FIG. 5, a three-command sequence "SET . . . GO . . . GO" is shown. The first "GO" follows the arming command, which is the right sequence to initiate a responsive action. However, the second "GO" is in error, since it is not preceded directly by an arming command.

Trace 5.2 shows the digitized signal 500 corresponding to these commands, relative to silence 501.

Trace 5.3 shows the voiced intervals 510, 511, and 512 which correspond to the E in "SET" and the first "GO" command and the second "GO" command, respectively. Trace 5.4 shows the unvoiced intervals 513 and 514, due to the S and T sounds in "SET" respectively. These sound intervals were detected, and the "SET" command was identified, according to the steps discussed with reference to FIG. 3.

Trace 5.5 shows silent intervals 520 and 521, as well as silent intervals preceding and following the command sequence. A silent interval in this example is any interval not being a voiced or unvoiced interval. The silent interval 520 indicates that the "SET" command is finished, and the silent interval 521 indicates that the first "GO" command is finished.

Trace 5.6 shows the arming parameter 522 which is set to the armed state at time 515 when the "SET" command has been identified as the arming command. The arming parameter 522 is then set back to the non-armed state at time 516 when the first "GO" is detected.

Trace 5.7 shows a pulse 530 comprising the immediate responsive action responsive to the first "GO" command. The voiced interval 511 of the first "GO" command is detected at the time 516, while the arming parameter 522 is still armed. This satisfies the trigger condition; hence the pulse 530 is initiated immediately, and then the arming parameter 522 is returned to the non-armed state.

Trace 5.8 shows an error message 532 which is generated at time 531. The error message 532 is generated because the second "GO" command occurs while the arming parameter 522 is in the non-armed state. Since the arming parameter 522 is non-armed when the second "GO" occurs, the trigger criterion is not satisfied, and no fast responsive action is initiated upon the second "GO" command. Instead, the second "GO" command is parsed and interpreted, to determine if perhaps it is some other legal command. However, the voiced interval 512 ends with silence at time 531, which indicates that the command has only one voiced interval and therefore is indeed a "GO" command. A trigger command without a preceding arming command is an error. Therefore the error message 532 is then generated.

As an alternative, some applications may accept a trigger command as legal, even without a preceding arming command. Such a non-armed trigger command may initiate the responsive action, but only after the non-armed trigger command has been fully spoken and parsed. Thus the operator can obtain an immediate pulse by calling "SET . . . GO", or a non-immediate pulse by calling just "GO" without the arming command. As a further alternative, the armed and non-armed responsive actions could be different, such as emitting a positive versus a negative pulse for example, depending on whether the arming parameter is armed. As a further alternative, a manual control such as a button may be provided, and the arming parameter could be armed whenever the button is pressed, thereby giving the operator an additional option for generating the preparatory event upon a mechanical change.

In the example of FIG. 5, the arming and trigger commands are discriminated by their leading sound type. The arming command "SET" begins with an unvoiced sound, whereas the trigger command "GO" begins with a voiced sound, and the two commands are discriminated thereby. According to the invention, the leading sound-type of a command is determined in real time; hence the first "GO" command is revealed as a trigger command right from the outset.

Rapid determination of the sound type has many uses, one of which is to abort an armed state by calling a disarming command. For example, the operator might call the arming command, but then may need to abort the operation without producing the responsive action. In that case, the operator would call the disarming command to set the arming parameter back to the non-armed state. However, the trigger command and the disarming command must have different leading sound types, so that they may be distinguished instantaneously. The example of FIG. 5 could accept the command "STAY" as a disarming command, which sets the arming parameter back to the non-armed state, without producing the fast responsive action. Importantly, this command would not be confused with a trigger command because it starts with an unvoiced sound, whereas the trigger command starts with a voiced sound. Also the disarming command would not be confused with the arming command "SET" because they have different sound type orders.

Figure 6:
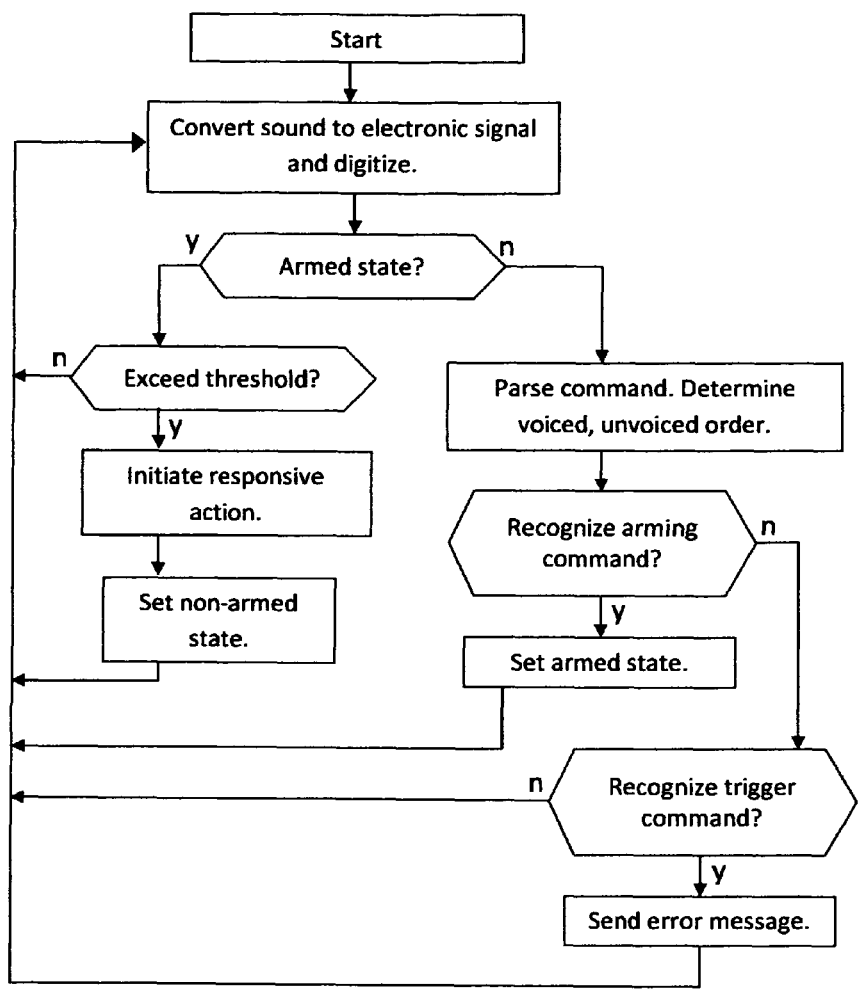
FIG. 6 is a flowchart showing how to obtain either a prompt responsive action, or a full command interpretation.

FIG. 6 is a flowchart showing how an arming command can control the timing of the responsive action. The flowchart of FIG. 6 follows closely the example of FIG. 5. The preparatory event is again an arming command. First, command sounds are converted to an electronic signal and digitized. Then, in the decision box labeled "Armed state?", the state of the arming parameter is interrogated. If the arming parameter is in the armed state (the "y" branch), then the digitized signal is then compared to a predetermined amplitude threshold in the decision box labeled "Exceed threshold?". If the digitized signal exceeds the amplitude threshold, the fast responsive action is immediately initiated and the arming parameter is set non-armed.

Returning to the first decision box, labeled "Armed state?", if the arming parameter is non-armed (the "n" case), then the sound is processed and the command is parsed and identified in the box labeled "Parse command. Determine voiced, unvoiced order". Then, if the command is recognized as the arming command, the arming parameter is set to the armed state. But if the command is not the arming command, the detected sound order is then checked against the trigger command in the decision box "Recognize trigger command?". If it is the trigger command, then an error message is sent because the armed parameter is still non-armed when the trigger is received. If the command is neither the arming nor the trigger command, it is ignored.

In every case the flow then returns to the beginning to convert more sound and listen for more commands.

As an option, there could be multiple different arming commands, each having a different arming parameter and a different responsive action. Thus the operator could specify a particular responsive action by calling one of the arming commands, and then calling the trigger command to obtain the desired response with fast timing. For example, the arming commands could be "SET PLUS" and "SET MINUS". The operator would call one of the arming commands and then the trigger command "GO". An output voltage would then be set to a positive voltage or a negative voltage depending on which arming command had been called. As a further option, the output voltage could be returned to ground upon a non-armed trigger command.

Figure 7:
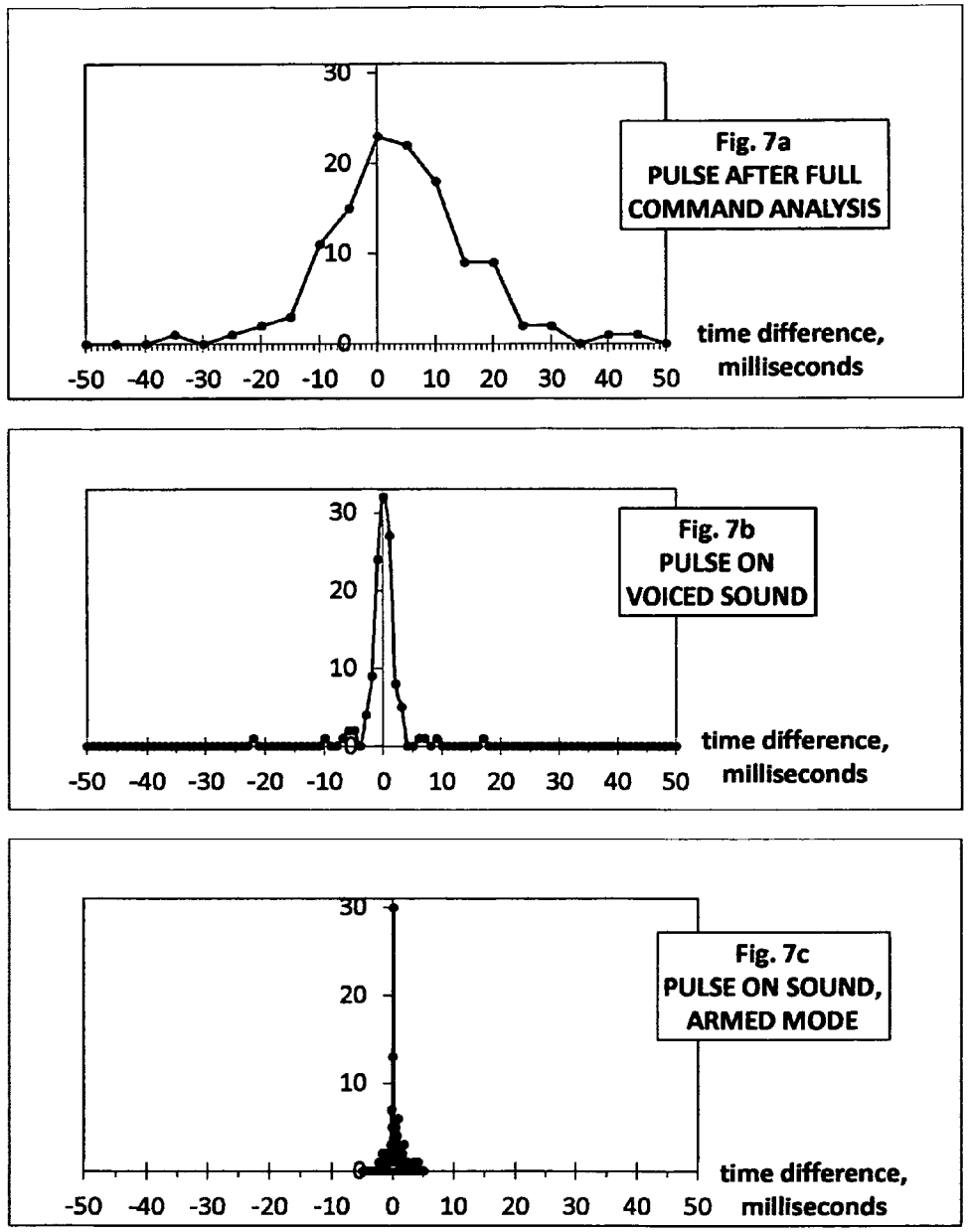
FIG. 7 is a set of graphs showing the measured response time distribution using different triggering methods.

Turning now to FIG. 7, a set of graphs shows the results of an experiment to measure the instrumental time resolution achievable with different triggering methods. To quantify the system response experimentally, two identical voice-activated pulser units were programmed to generate a short pulse output on voice command. The preparatory event was the arming command "SET" and the triggering command was "GO". The two output pulses were connected to the two inputs of a dual-trace oscilloscope. The oscilloscope was triggered on one of the pulses, and displayed both of the pulses on two traces simultaneously. The time difference between the two pulses was then measured by observing the shift in pulse time between the two traces. The two-pulser arrangement eliminates all operator delays and human factors, but reveals all instrumental delays present in either pulser unit. Therefore, the observed distribution of time differences between the two pulses is a measure of the variation in response time of the pulser units.

FIG. 7a, labeled "Pulse after full command analysis", shows the results of 120 voice command trials with the two-pulser setup. For FIG. 7a, the pulser units were programmed to generate the responsive pulses, not upon the first sound, but rather at the end after the command was finished and analyzed. This partially imitates the timing expected from prior art methods that lack the immediate-response feature of the inventive method. However a real prior art system would also have several additional sources of time uncertainty that could not be arranged for this test, such as variable delays associated with a wireless link and remote computer processing.

On each "GO" command, both pulsers produced a responsive output pulse after parsing the command, and the time difference between the two output pulses was noted. The distribution of observed time differences is plotted as a histogram in FIG. 7a. The time axis is the time difference between the two pulses, in the range of −50 milliseconds to +50 milliseconds. The vertical axis, unlabeled, is the number of events in each time-difference bin, which for FIG. 7a is 5 milliseconds wide. The time resolution, given by the central spread, is about 24 milliseconds. If the application does not require precision timing, for example turning a faucet on or off by voice command, then the a time resolution of 24 milliseconds is acceptable. But for many test and measurement applications involving fast transient behavior, much better time resolution is needed. Also, the post-command pulses in FIG. 7a were non-prompt since they occurred after the trigger command was finished. The pulses thus occurred about 300 to 600 milliseconds after the leading sound of the trigger command, since that is roughly how long the trigger command sound persists. However, this delay does not show up in the plot since it is the same for both units.

FIG. 7b, labeled "Pulse on voiced sound", shows the results of a second experiment under the same conditions as FIG. 7a except that the pulser units now employed the inventive method. Specifically, the pulser units were programmed to detect the voiced or unvoiced sound type of the trigger command, and to generate an immediate output pulse only if it is voiced. Also, according to the inventive principles, the output pulse was initiated as soon as the voiced sound was first detected, which is when the smoothed-slow-wave signal first exceeded the voiced-sound threshold. FIG. 7b shows the time distribution of 120 trigger commands with prompt sound-type triggering. Each time-difference bin is now 1 millisecond wide. As the distribution in FIG. 7b clearly shows, initiating the pulses immediately upon the smoothed-sound-type detection resulted in a substantial improvement in the time distribution. The central peak width was been narrowed to only 2.3 milliseconds, which is sufficient for many measurement requirements. The distribution of FIG. 7b shows that improved time resolution can be obtained by initiating a responsive action on the leading edge of a particular sound type.

In some applications, however, sound type is not important, and an even finer time resolution is needed. For such applications, the responsive action may be initiated upon the first detection of any sound, regardless of sound type, as in single-wave triggering. Specifically, the responsive action is initiated when the digitized signal exceeds an amplitude threshold, after first being armed by an arming command. FIG. 7c, labeled "Pulse on sound, armed mode", shows the results of this third experiment. The pulser units were programmed to respond instantly to any sound after the arming command "SET". The trigger command was again "GO". Both pulser units generated a near-instantaneous output pulse upon the first sound of the trigger command. The observed time distribution, shown in FIG. 7c, is so narrow the actual width cannot be resolved on the scale of the graph. Therefore, to more clearly show the performance, the same data were re-plotted on a highly magnified time scale in FIG. 8 and with a time-difference bin width of only 0.1 millisecond. Remarkably, most of the pulses occurred within just 0.082 milliseconds of each other in the armed mode. That's 25 times better than the distribution of FIG. 7b, and nearly 300 times better than the prior art case, FIG. 7a. As is well known to those with experience in voice-activation, sub-millisecond timing represents a phenomenal time resolution; the inventive method routinely obtains such performance. No freeform speech-interpretation code can even approach this time resolution, despite massive supercomputer support. Furthermore, the observed time distribution shown in FIGS. 7 and 8 is actually the combined resolution of the two independent pulser units; assuming Gaussian distributions, the actual response width of each single pulser unit was $1/\sqrt{2}$ smaller.

Figure 8:
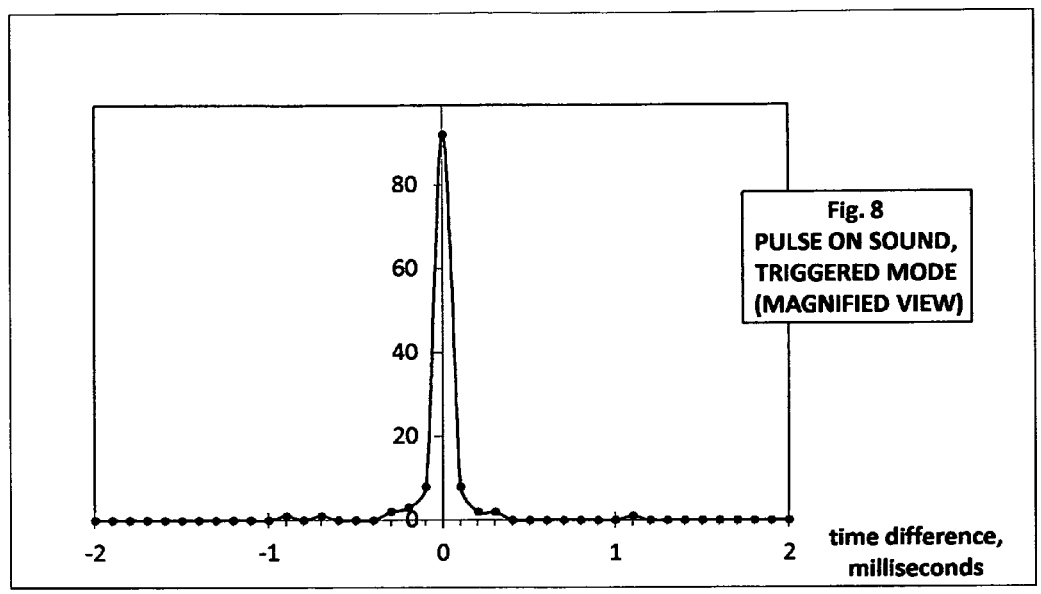
FIG. 8 is graph showing a highly magnified view of the measured time distribution of responses obtained by armed triggering.

The experimental results shown in FIG. 7 and FIG. 8 demonstrate that the inventive method enables user-controlled voice-activated precision timing for the first time.

The embodiments and examples provided herein illustrate the principles of the invention and its practical application, thereby enabling one of ordinary skill in the art to best utilize the invention. Many other variations and modifications and other uses will become apparent to those skilled in the art, without departing from the scope of the invention, which is to be defined by the appended claims.

The invention claimed is:

1. A method comprising:
converting sound to an electrical signal, and analyzing the electrical signal;
during the analyzing of the electrical signal:
detecting a preparatory event;
after detecting the preparatory event, detecting, based on the analyzing of the electrical signal, a silent interval, wherein the silent interval has a duration which is at least equal to a predetermined value Sinitial;
after detecting the silent interval, detecting, based on the analyzing of the electrical signal, that an initial sound that follows the silent interval exceeds a predetermined threshold;
immediately after detecting that the initial sound exceeds the predetermined threshold, initiating a responsive action,
wherein the initial sound is an initial portion of a spoken command,
and wherein the responsive action is responsive to the spoken command.

2. The method of claim 1 wherein the preparatory event comprises: a spoken command, or a mechanical change, or a voltage, or a digital message, or an electronic signal, or an optical signal, or an acoustical signal.

3. The method of claim 1 wherein Sinitial is in a range of 50 milliseconds to 900 milliseconds.

4. The method of claim 1, further comprising:
after detecting the preparatory event, setting an arming parameter to an armed state.

5. The method of claim 1 wherein the responsive action includes setting the arming parameter to a non-armed state.

6. The method of claim 1 wherein the preparatory event is a spoken arming command.

7. The method of claim 1 further comprising:
detecting a spoken disarming command;
and, after detecting the spoken disarming command, setting the arming parameter to a non-armed state.

8. The method of claim 1, further comprising:
detecting that a manually operated control has been operated;
and, after detecting that the manually operated control has been operated, setting the arming parameter to a particular state, wherein the particular state is either the armed state or a non-armed state.

9. The method of claim 4, further comprising:
setting, when the arming parameter is set to a non-armed state, the predetermined threshold to a high value, wherein the high value has a value which is higher than a low value;
and setting, when the arming parameter is set to the armed state, the predetermined threshold to the low value.

10. The method of claim 4, further comprising:
providing an arming command which comprises intervals of voiced sound and which comprises intervals of unvoiced sound, wherein the intervals of voiced sound and the intervals of unvoiced sound are ordered in a particular arming-command order;
detecting intervals of voiced sound and detecting intervals of unvoiced sound, wherein the detected intervals of voiced sound and the detected intervals of unvoiced sound are detected in a detected-command order;
and, if the detected-command order matches the particular arming-command order, setting the arming parameter to the armed state.

11. The method of claim 4, further comprising:
providing an arming command which comprises intervals of voiced sound, which comprises intervals of unvoiced sound, and which comprises intervals of silence, wherein the intervals of voiced sound, the intervals of unvoiced sound, and the intervals of silence, are ordered in a particular arming-command order;
detecting intervals of voiced sound, detecting intervals of unvoiced sound, and detecting intervals of silence, wherein the detected intervals of voiced sound, the detected intervals of unvoiced sound, and the detected intervals of silence, are detected in a detected-command order;
and, if the detected-command order matches the particular arming-command order, setting the arming parameter to the armed state.

12. The method of claim 4, further comprising:
determining if the initial sound corresponds to either a voiced sound or an unvoiced sound;
if the initial sound corresponds to a voiced sound, initiating a responsive action of a first kind;
and if the initial sound corresponds to an unvoiced sound, initiating a responsive action of a second kind.

13. The method of claim 1, further comprising:
adjusting the predetermined threshold;
and comparing the initial sound to the adjusted predetermined threshold.

14. The method of claim 13, further comprising:
detecting a spoken threshold-increase command;
and, in response to the spoken threshold-increase command, increasing the predetermined threshold.

15. The method of claim 13, further comprising:
detecting a spoken threshold-decrease command;
and, in response to the spoken threshold-decrease command, decreasing the predetermined threshold.

16. The method of claim 13, further comprising:
adjusting the predetermined threshold when the preparatory event is detected.

17. The method of claim 13, further comprising:
after the responsive action is initiated, adjusting the predetermined threshold.

18. The method of claim 13, further comprising:
measuring ambient noise, thereby producing ambient noise measurements;
and adjusting, according to the ambient noise measurements, the predetermined threshold.

* * * * *